(12) United States Patent
Chmiel et al.

(10) Patent No.: US 6,756,756 B1
(45) Date of Patent: Jun. 29, 2004

(54) PHASE DETECTOR MOTOR START SWITCH

(75) Inventors: Steven F. Chmiel, Cudahy, WI (US); Joseph S. Bossi, West Allis, WI (US); Victor A. Murn, Muskego, WI (US)

(73) Assignee: Rexnard Corporation, Cudahy, WI (US)

( * ) Notice: Subject to any disclaimer, the term of this patent is extended or adjusted under 35 U.S.C. 154(b) by 33 days.

(21) Appl. No.: 10/264,702

(22) Filed: Oct. 4, 2002

(51) Int. Cl.[7] .................................................. H02P 1/04
(52) U.S. Cl. ..................... 318/430; 318/786; 318/785; 318/763; 318/778
(58) Field of Search ................................ 318/430, 786, 318/785, 763, 778

(56) References Cited

U.S. PATENT DOCUMENTS

| | | | |
|---|---|---|---|
| 4,604,563 A | | 8/1986 | Min |
| 4,622,506 A | | 11/1986 | Shemanske et al. |
| 4,658,195 A | | 4/1987 | Min |
| 4,670,697 A | | 6/1987 | Wrege et al. |
| 4,687,982 A | * | 8/1987 | Palaniappan ................ 318/763 |
| 4,719,399 A | | 1/1988 | Wrege |
| 4,745,347 A | * | 5/1988 | Wrege et al. ................ 318/744 |
| 4,751,449 A | * | 6/1988 | Chmiel ........................ 318/786 |
| 4,751,450 A | | 6/1988 | Lorenz et al. |
| 4,782,278 A | | 11/1988 | Bossi et al. |
| 4,786,850 A | | 11/1988 | Chmiel |
| 5,017,853 A | | 5/1991 | Chmiel |
| 5,206,573 A | | 4/1993 | McCleer et al. |
| 5,559,418 A | | 9/1996 | Burkhart |
| 6,160,372 A | * | 12/2000 | Cusack ........................ 318/786 |

* cited by examiner

*Primary Examiner*—Karen Masih
(74) *Attorney, Agent, or Firm*—Andrus, Sceales, Starke & Sawall, LLC

(57) ABSTRACT

In an AC motor having a main winding connectable to an AC power source for supplying running torque, and having a start winding connectable to the AC power source for supplying starting torque, a start switch is provided for connecting and disconnecting the start winding from the AC power source in starting and running modes, respectively. A main winding voltage phase detector detects the phase of voltage across the main winding. A start winding current phase detector detects the phase of current through the start winding during the starting mode. A cut-out circuit responds to the main winding voltage phase detector and to the start winding current phase detector.

18 Claims, 2 Drawing Sheets

US 6,756,756 B1

PHASE DETECTOR MOTOR START SWITCH

BACKGROUND OF THE INVENTION

The invention relates to a start switch for an AC motor, also called a disconnect or cut-out switch.

A single phase AC induction motor typically includes a squirrel cage rotor and two stator windings, namely a main winding and a start or auxiliary winding. The main winding is connected across an AC power source and normally has low resistance and high inductance. The start or auxiliary winding is physically displaced from the main winding and has high resistance and low inductance. In a split phase type AC motor, the physical displacement of the motor stator windings together with the electrical phase displacement produced by the different resistance and inductance values generates a rotating magnetic field sufficient to provide a low level starting torque. Other types of single phase AC induction motors for higher torque applications include capacitor start type motors and capacitor start run type motors. In these types of motors, a capacitor is connected in series with the start winding to provide higher starting torque. In each of the motor types, after the motor has accelerated to 75 to 80 percent of its synchronous speed, a switch opens and the start winding is disconnected from the AC power source.

Various types of disconnection systems are known. In one type of known system, the voltages across the main and start windings are compared, for example U.S. Pat. Nos. 4,622,506, 4,670,697, 4,782,278, including the relative phase therebetween, for example U.S. Pat. No. 5,559,418, and the start winding is disconnected in response to a given voltage magnitude and/or phase relation. In these types of systems, there is a comparison of voltage to voltage. In another system, for example U.S. Pat. No. 5,206,573, the start winding is disconnected in response to a given phase relation of the currents through the main and start windings. In these types of systems, there is a comparison of current to current.

SUMMARY OF THE INVENTION

The present invention provides a simple, low cost motor starting controller that is speed sensitive, load sensitive, and AC line voltage insensitive. The start winding is disconnected in response to a given phase relation between the main winding voltage and the start winding current. In this system, there is a comparison of voltage phase to current phase during starting of the motor. In the present system, there is provided a main winding voltage phase detector detecting the phase of voltage across the main winding, a start winding current phase detector detecting the phase of current through the start winding during the starting mode, and a cut-out circuit responsive to the main winding voltage phase detector and to the start winding current phase detector and actuating the start switch to the running mode, disconnecting the start winding from the AC source, in response to a given phase relation between the main winding voltage and the start winding current.

DETAILED DESCRIPTION OF THE INVENTION

As known in the prior art, a single phase AC induction motor has a main winding for running the motor, and a start or auxiliary winding together with the run winding for starting the motor. The start circuit is energized when starting the motor from rest and then disconnected at a given motor speed. The fields in the main and start windings are phase shifted, for example by capacitance, inductance, resistance or the like, to establish a rotating magnetic field for starting and/or running torque.

Figure 1:
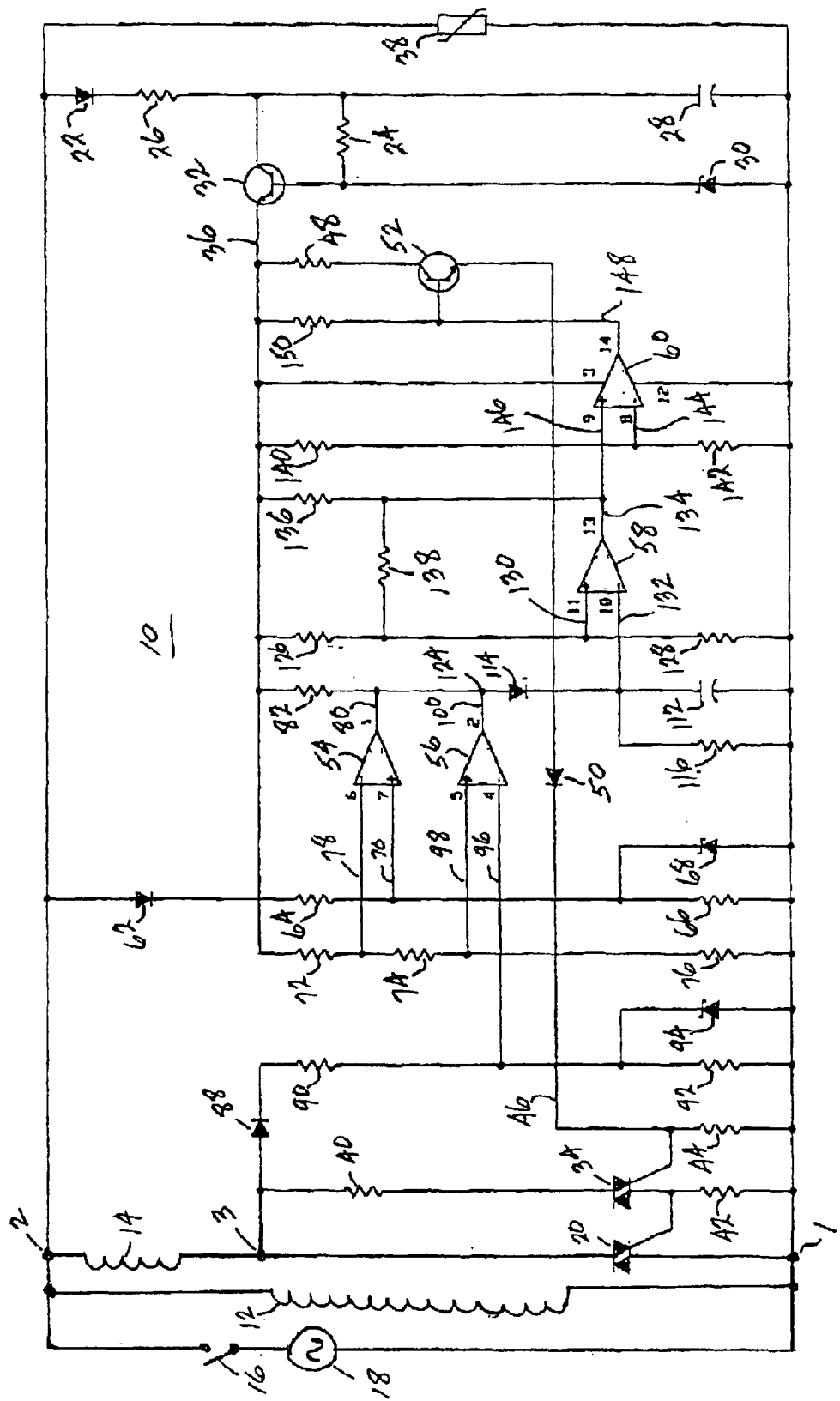
FIG. 1 is a circuit diagram illustrating a phase detector motor starting control circuit in accordance with the invention.

FIG. 1 shows a motor starting circuit 10 for use with a single phase AC induction motor having a main winding 12 and a start or auxiliary winding 14 both connectable by a switch 16 to an AC power source 18 at terminals 1 and 2. In capacitor start and capacitor start run type motors, the start winding circuit includes a start capacitor (not shown) connected in series with start winding 14. In split phase type motors, the noted start capacitor is omitted, as is shown in FIG. 1. A start switch is provided by triac 20 connected in series with start winding 14. The series connected start switch 20 and start winding 14 are connected in parallel with main winding 12 across AC source 18. Triac 20 has a conductive ON state conducting current therethrough to complete a current path through start winding 14 from AC source 18. Triac 20 has a non-conductive OFF state blocking current flow through start winding 14 from AC source 18. The present phase detector circuitry compares the relative phase relationship between the applied line voltage across main winding 12 applied from AC source 18 and the start circuit current through start winding 14 during motor starting, and de-energizes the start circuit at an appropriate motor speed.

Referring to FIG. 1, rectifier diode 22, base current limiting resistor 24, capacitor current limiting resistor 26, filtering capacitor 28, voltage regulating zener diode 30 and voltage regulating NPN bipolar transistor 32 provide a halfwave rectified, filtered and regulated power supply for operation of the detection circuitry and triggering of pilot triac 34 to trigger power triac 20. The power supply is connected to AC power source 18 and outputs power supply voltage at line 36. Metal oxide varistor 38 provides transient over-voltage protection.

Main winding 12 is connected across terminals 1 and 2 to the line voltage supplied by AC source 18 for supplying running torque. Start winding 14 is connected across controller terminals 2 and 3 to the AC source for supplying starting torque. Power triac 20 is connected across terminals 1 and 3, in series with start winding 14 across terminals 1 and 2 for receiving line voltage. Power triac 20 derives gate trigger current through gate current limiting resistor 40 and pilot triac 34, to be described. Resistor 42 is a gate bypass resistor for power triac 20, preventing false triggering thereof. Resistor 44 is a gate bypass resistor for pilot triac 34, preventing false triggering thereof.

Upon application of power from AC source 18 to the motor and controller, by closure of switch 16, the noted regulated power supply provides gate trigger current on line 46 to pilot triac 34 through gate current limiting resistor 48 and diode 50. Gate current control NPN bipolar transistor 52 is biased into conduction during this time, to be described. Pilot triac 34 switches to the conductive state, allowing power triac 20 to draw gate trigger current through start winding 14, gate current limiting resistor 40 and conducting triac 34 to the gate of triac 20, which then switches into conduction to connect motor start winding 14 to the power line at terminals 1 and 2.

The phase detection circuitry includes comparators 54, 56, 58, 60, collectively preferably provided by a quad comparator integrated circuit, provided by an LM339 integrated circuit, where manufacturer assigned pin number designations are shown to facilitate understanding. Phase detection of the voltage across main winding 12 is provided by rectifier diode 62, resistors 64, 66, and zener diode 68. The half-wave rectified, zener regulated voltage phase information is input at line 70 to non-inverting input pin 7 of comparator 54. A fixed DC reference voltage, from line 36, provided by the resistor network of resistors 72, 74, 76, is input at line 78 to inverting input pin 6 of comparator 54. Output pin 1 of comparator 54 at line 80 transitions high through pull-up resistor 82, as shown at 84 in FIG. 2, substantially in phase with main winding voltage zero-crossing 86 when the applied voltage across main winding 12 is such that terminal 2 is positive with respect to terminal 1.

Phase detection of start circuit current is provided by rectifier diode 88, resistors 90, 92, and zener diode 94. The half-wave rectified, zener regulated start circuit phase information is input at line 96 to inverting input pin 4 of comparator 56. A fixed DC reference voltage, from line 36, provided by the resistor network of resistors 72, 74, 76, is input at line 98 to non-inverting input pin 5 of comparator 56. During each half-cycle of conduction of power triac 20, a voltage is developed across power triac 20 equal to the principal current multiplied by the device on-state resistance. The voltage drop across power triac 20 is substantially in phase with the current flow through start winding 14 and triac 20. Output pin 2 of comparator 56 at line 100 transitions low as shown at 102, FIG. 2, through pull-up resistor 82, substantially in phase with start circuit current zero-crossing 104 where terminal 3 is positive with respect to terminal 1. In a pure inductive circuit, the applied voltage E leads inductor current I by 90 electrical degrees. The detection circuit of FIG. 1 detects and compares the relative phase shift of the voltage across main winding 12 to the start circuit current through start winding 14 and triac 20.

Figure 2:
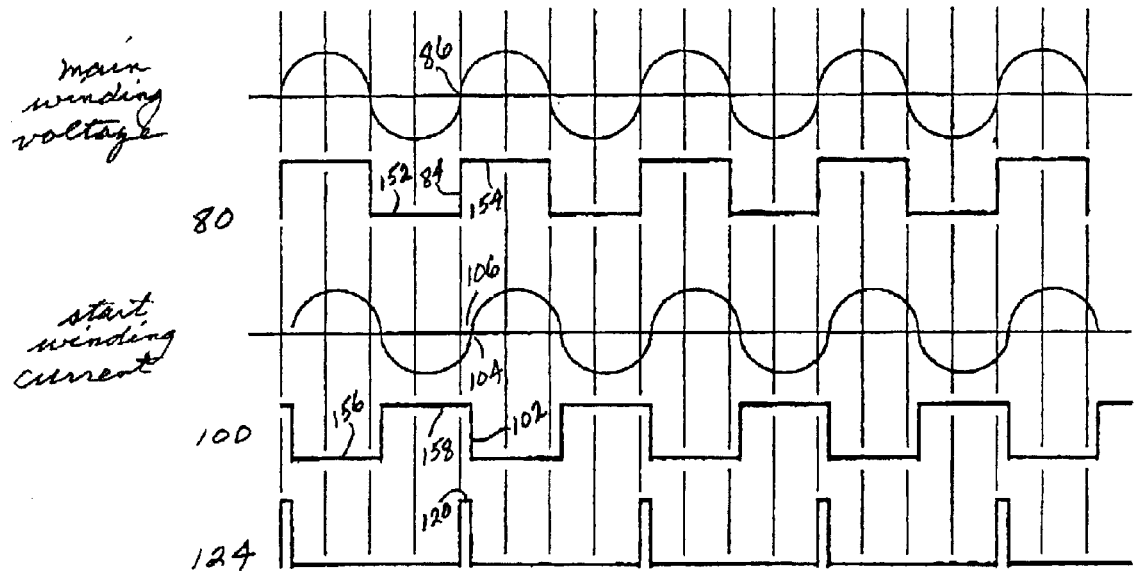
FIG. 2 is a timing diagram illustrating operation of the circuit of FIG. 1.
Figure 3:
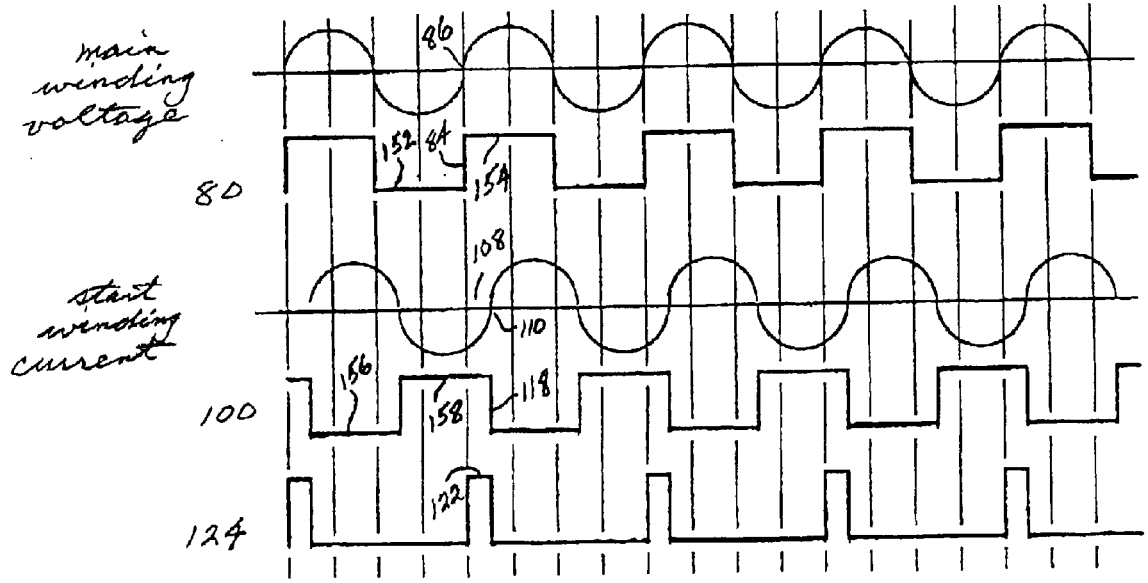
FIG. 3 is a timing diagram further illustrating operation of the circuit of FIG. 1.

FIG. 2 shows timing waveforms at low motor rotor speeds upon initial application of power from AC source 18 upon closure of switch 16. The main winding voltage and the start winding current are substantially in phase, i.e. there is only a small delay 106, FIG. 2, between zero-crossing 86 and zero-crossing 104. As the motor speed increases, a greater phase shift and delay 108, FIG. 3, occurs between zero-crossing 86 of the main winding voltage and zero-crossing 110 of the start winding current.

During the initial application of line voltage, FIG. 2, when controller main terminal 2 is positive with respect to controller main terminal 1, output pin 1 of comparator 54 at line 80 transitions high as shown at 84, and capacitor 112 begins to charge through resistor 82 and diode 114. Assuming that the motor rotor had been at rest, i.e., zero rotational speed, the start circuit current through start winding 14 and triac 20 is substantially in phase with the voltage across main winding 12. Thus, output pin 2 of comparator 56 at line 100 transitions low at 102, bypassing the charging current for capacitor 112, which capacitor begins to discharge through resistor 116. As the motor speed increases, the phase shift between main winding voltage and start winding current increases, e.g. from 106 to 108, FIGS. 2, 3, and thus capacitor 112 assumes a greater and greater charge as motor speed increases. This is shown at transition 118 in FIG. 3 which is delayed relative to transition 102 in FIG. 2 and has a greater phase shift 108 as compared to phase shift 106, relative to zero-crossing 86. This is also shown at the increased pulse width from 120 in FIG. 2 at zero or low motor speed, to the wider pulse width 122 in FIG. 3 at higher motor speed, which are the signals present at the output 80 and 100 combined at node 124 which is the anode of diode 114.

Comparator 58 has a fixed DC reference voltage, provided by the resistor network of resistors 126, 128, from line 36, supplied to non-inverting input pin 11 of comparator 58 at line 130. The voltage charge on capacitor 112 is supplied to inverting pin 10 at line 132. When the charge on capacitor 112 reaches a given voltage level, as determined by the increasing pulse width at node 124 as motor speed increases, the voltage on line 132 increases above the fixed DC reference voltage on line 130, and output pin 13 of comparator 58 at line 134 transitions low through pull-up resistor 136. The transition low at line 134 occurs upon the designated cut-out phase shift between main winding voltage and start winding current, i.e. upon increase of the delay from 106 to 108, FIGS. 2, 3, corresponding to the increased pulse width from 120 to 122 which in turn supplies increased charging current to capacitor 112 to charge the latter to a higher voltage level. The low state at output pin 13 of comparator 58 at line 134 is applied through feedback hysteresis resistor 138 to input pin 11 of comparator 58 at line 130, providing hysteresis to a second lower voltage level relating to a cut-in phase shift between the main winding voltage and the voltage induced across triac 20 during the running mode after the noted disconnection, to be described.

An output buffer is provided by comparator 60. A fixed DC reference voltage, provided by the resistor network of resistors 140, 142, from line 36, is applied to inverting pin 8 of comparator 60 at line 144. The output of comparator 58 on line 134 is applied to non-inverting input pin 9 of comparator 60 at line 146. When output pin 13 of comparator 58 at line 134 transitions low, the voltage at input pin 9 of comparator 60 at line 146 drops below the fixed DC reference voltage level at line 144, and output pin 14 of comparator 60 at line 148 transitions low through pull-up resistor 150, such that transistor 52 turns off, thus terminating gate current to pilot triac 34 which in turn terminates the gate current to power triac 20, and hence power triac 20 turns off, thus disconnecting start winding 14 from the AC line voltage at terminals 2 and 1. The motor then accelerates to full running speed on the main winding 12 only.

During the noted running mode of the motor, with triac 20 nonconductive and start winding 14 thus disconnected, the phase relationship between the main winding voltage and the voltage induced across the off-state triac is monitored. During this running mode, it is preferred that the charge on capacitor 112 at line 132 be maintained at a higher level than the voltage on line 130, which latter voltage is at a lower cut-in level due to feedback hysteresis resistor 138 connected to the now low signal at output pin 13 of comparator 58 on line 134. If the motor should encounter a stall or overload condition during this running mode, the phase relationship between main winding voltage and the voltage across off-state triac 20 changes such that the charge on capacitor 112 at line 132 drops to a lower level than the cut-in voltage level on line 130. Output pin 13 of comparator 58 at line 134 then transitions high, causing input pin 9 of comparator 60 at line 146 to increase in voltage level above that at line 144, thus causing output pin 14 of comparator 60 at line 148 to transition high, thus triggering transistor 52 into conduction, to in turn supply gate current to pilot triac 34, to in turn supply gate current to main triac 20, such that the latter is triggered into conduction to thus complete a circuit through start winding 14 and triac 20 to thus reconnect start winding 14 to the applied voltage at terminals 2 and 1, thus reenergizing start winding 14 to apply additional torque for accelerating the motor from the noted stall or overload condition.

Main winding 12 is connectable through switch 16 to AC power source 18 for supplying running torque. Start winding 14 is connectable through triac 20 to AC source 18 for supplying starting torque. The start switch circuitry is provided for connecting and disconnecting start winding 14 from AC power source 18 in starting and running modes, respectively. The circuitry includes the main winding voltage phase detector at the input of comparator 54 detecting the phase of voltage across the main winding, and the start winding current phase detector at the input of comparator 56 detecting the phase of current through the start winding during the starting mode. The cut-out circuit at the input of comparator 58 responds to the main winding voltage phase detector and to the start winding current phase detector through comparators 54 and 56 and actuates the start switch to the running mode in response to the noted given phase relation between main winding voltage and start winding current. The comparator circuitry compares the phases of the main winding voltage and the start winding current and triggers the cut-out circuit in response to the given phase relation. The comparator circuit has a first input at 70 from the main winding voltage phase detector and a first output at 80 transitioning between first and second states 152 and 154, FIGS. 2, 3 in phase with the main winding voltage and at a pulse width determined by the frequency of the main winding voltage. The comparator circuit has a second input at 96 from the start winding current phase detector and a second output at 100 transitioning between first and second states 156 and 158 in phase with start winding current and at a pulse width determined by the frequency of the start winding current. The pulse widths at 154 and 158 from the noted first and second outputs 80 and 100 are combined at node 124 to provide a combined pulse width 120. The cut-out circuit responds to this combined pulse width, for example at increased pulse width 122 at increasing motor speed increasing the charge on capacitor 112. The noted pulse widths at 154 and 158 from the noted first and second outputs 80 and 100 are combined in ANDed relation by connecting outputs 80 and 100 to a common node 124 at the annode of diode 114 supplying charging current therethrough to capacitor 112. Comparator 58 has an input at 132 from common node 124 through diode 114 charging capacitor 112, and has an output at 134 connected to the cutout circuit to trigger the latter to the noted running mode in response to a given charge on capacitor 112. The circuitry at input 96 of comparator 56 also provides a start switch voltage phase detector detecting the phase of voltage across the start switch in the noted running mode, and comparator 58 also provides a cut-in circuit responsive to the main winding voltage phase detector and to the starting switch voltage phase detector at respective inputs 70 and 96 of respective comparators 54 and 56, and actuates the start switch to the start mode to re-connect start winding 14 to AC source 18 in response to a given phase relation between the main winding voltage and the start switch voltage in the running mode, the latter being the voltage induced across off-state triac 20 in the running mode. The cut-in circuit actuates the start switch to the starting mode at a lower motor speed than the cut-out circuit actuates the start switch to the running mode, due to feedback hysteresis resistor 138.

It is recognized that various equivalence, alternatives and modifications are possible within the scope of the appended claims.

What is claimed is:

1. In an AC motor having a main winding connectable to an AC power source for supplying running torque, and having a start winding connectable to said AC power source for supplying starting torque, a start switch for connecting and disconnecting said start winding from said AC power source in starting and running modes, respectively, comprising a main winding voltage phase detector detecting the phase of voltage across said main winding, a start winding current phase detector detecting the phase of current through said start winding during said starting mode, and a cut-out circuit responsive to said main winding voltage phase detector and to said start winding current phase detector and actuating said start switch to said running mode in response to a given phase relation between said main winding voltage and said start winding current.

2. The start switch according to claim 1 comprising a comparator circuit comparing the phases of said main winding voltage and said start winding current and triggering said cut-out circuit in response to said given phase relation.

3. The start switch according to claim 2 wherein said comparator circuit has a first input from said main winding voltage phase detector and a first output transitioning between first and second states in phase with said main winding voltage and at a pulse width determined by the frequency of said main winding voltage, and has a second input from said start winding current phase detector and a second output transitioning between first and second states in phase with said start winding current and at a pulse width determined by the frequency of said start winding current.

4. The start switch according to claim 3 wherein said pulse widths from said first and second outputs are combined to provide a combined pulse width, and wherein said cut-out circuit responds to said combined pulse width.

5. The start switch according to claim 4 wherein said pulse widths from said first and second outputs are combined in ANDed relation by connecting said first and second outputs to a common node.

6. The start switch according to claim 2 wherein said comparator circuit comprises a first comparator having a first input from said main winding voltage phase detector, a second comparator having a first input from said start winding current phase detector, each of said first and second comparators having an output connected to a common node, a capacitor connected to said common node and charged therefrom, a third comparator having a first input from said common node and having an output connected to said cut-out circuit to trigger the latter to said running mode in response to a given charge on said capacitor.

7. The start switch according to claim 6 comprising a power supply circuit connected to AC power source and outputting a power supply voltage, and wherein said first, second and third comparators each have a second input from said power supply circuit.

8. The start switch according to claim 2 comprising a start switch voltage phase detector detecting the phase of voltage across said start switch in said running mode, and a cut-in circuit responsive to said main winding voltage phase detector and to said start switch voltage phase detector and actuating said start switch to said starting mode in response to a given phase relation between said main winding voltage and said start switch voltage in said running mode.

9. The start switch according to claim 8 wherein said cut-in circuit actuates said start switch to said starting mode at a lower motor speed than said cut-out circuit actuates said start switch to said running mode.

10. The start switch according to claim 9 comprising a power supply circuit connected to said AC power source and outputting a power supply voltage, and wherein said comparator circuit comprises a first comparator having a first input from said main winding voltage phase detector and a second input from said power supply circuit, a second comparator having a first input from said start winding current phase detector and a second input from said power supply circuit, each of said first and second comparators having an output connected to a common node, a capacitor connected to said common node and charged therefrom, a third comparator having a first input from said common node and a second input from said power supply circuit and an output connected to said cut-out circuit to trigger the latter to said running mode in response to a given charge on said capacitor, a feedback hysteresis resistor connected between said output of said third comparator and said second input of said third comparator, said first input of said second comparator being connected to said start switch voltage phase detector.

11. A method for starting an AC motor having a main winding connectable to an AC power source for supplying running torque, and having a start winding connectable to said AC power source for supplying starting torque, comprising providing a start switch and connecting and disconnecting said start winding from said AC power source in starting and running modes, respectively, by sensing the phase of voltage across said main winding, sensing the phase of current through said start winding during said starting mode, and actuating said start switch to said running mode in response to a given phase relation between said main winding voltage and said start winding current.

12. The method according to claim 11 comprising comparing the phases of said main winding voltage and said start winding current and actuating said start switch to disconnect said start winding from said AC power source in response to said given phase relation.

13. The method according to claim 12 comprising providing a comparator circuit having a first input sensing the phase of main winding voltage, and having a first output, transitioning said first output between first and second states in phase with said main winding voltage and at a pulse width determined by the frequency of said main winding voltage, providing said comparator circuit with a second input sensing the phase of start winding current, and a second output, transitioning said second output between first and second states in phase with said start winding current and at a pulse width determined by the frequency of said start winding current.

14. The method according to claim 13 comprising combining said pulse widths from said first and second outputs to provide a combined pulse width, and responding to said combined pulse width to actuate said start switch to disconnect said start winding from said AC power source.

15. The method according to claim 14 comprising AND-ing said first and second outputs by connecting said first and second outputs to a common node to combine said pulse widths.

16. The method according to claim 12 comprising providing a comparator circuit having a first comparator having a first input sensing the phase of main winding voltage, a second comparator having a first input sensing the phase of start winding current, each of said first and second comparators having an output, connecting said outputs to a common node, charging a capacitor from said common node, providing a third comparator having a first input from said common node, and having an output actuating said start switch to disconnect said start winding from said AC power source in response to a given charge on said capacitor.

17. The method according to claim 12 comprising sensing the phase of voltage across said start switch in said running mode, and responding to said main winding voltage phase and said start switch voltage phase and actuating said start switch to said starting mode to reconnect said start winding to said AC power source in response to a given phase relation between said main winding voltage and said start switch voltage in said running mode.

18. The method according to claim 17 comprising actuating said start switch to said starting mode to reconnect said start winding to said AC power source at a lower motor speed than actuating said start switch to said running mode to disconnect said start switch from said AC power source.

* * * * *

UNITED STATES PATENT AND TRADEMARK OFFICE
CERTIFICATE OF CORRECTION

PATENT NO. : 6,756,756 B1
DATED : June 29, 2004
INVENTOR(S) : Steven F. Chmiel et al.

It is certified that error appears in the above-identified patent and that said Letters Patent is hereby corrected as shown below:

Title page,
Item [*] Notice, delete "bydays.days" and substitute therefor -- by 33 days --

Signed and Sealed this

Fifteenth Day of February, 2005

JON W. DUDAS
*Director of the United States Patent and Trademark Office*